United States Patent
Pihur et al.

(10) Patent No.: US 11,341,429 B1
(45) Date of Patent: May 24, 2022

(54) DISTRIBUTED MACHINE LEARNING FOR IMPROVED PRIVACY

(71) Applicant: Snap Inc., Santa Monica, CA (US)

(72) Inventors: Vasyl Pihur, Venice, CA (US); Subhash Sankuratripati, Playa Vista, CA (US); Dachuan Huang, Santa Monica, CA (US); Antonio Marcedone, New York, NY (US); Frederick Liu, Playa Vista, CA (US); Ruogu Zeng, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 869 days.

(21) Appl. No.: 16/158,010

(22) Filed: Oct. 11, 2018

Related U.S. Application Data

(60) Provisional application No. 62/571,080, filed on Oct. 11, 2017.

(51) Int. Cl.
| | |
|---|---|
| *G06N 99/00* | (2019.01) |
| *G06N 5/04* | (2006.01) |
| *G06F 21/57* | (2013.01) |
| *G06N 20/00* | (2019.01) |
| *H04L 51/52* | (2022.01) |
| *H04L 51/18* | (2022.01) |

(52) U.S. Cl.
CPC ............. *G06N 20/00* (2019.01); *G06N 5/04* (2013.01); *H04L 51/18* (2013.01); *H04L 51/32* (2013.01)

(58) Field of Classification Search
CPC . H04L 20/00; H04L 5/04; H04L 51/32; H04L 51/18
See application file for complete search history.

(56) References Cited

U.S. PATENT DOCUMENTS

| | | | | |
|---|---|---|---|---|
| 7,024,429 | B2 * | 4/2006 | Ngo | G06F 16/184 |
| 9,659,254 | B2 * | 5/2017 | Achin | G06Q 10/04 |
| 2013/0085962 | A1 * | 4/2013 | Duncanson | G06Q 10/10 |
| | | | | 705/348 |
| 2014/0280142 | A1 * | 9/2014 | Wasson | G06F 16/2465 |
| | | | | 707/737 |
| 2015/0356301 | A1 * | 12/2015 | Diehl | H04L 41/12 |
| | | | | 726/22 |
| 2017/0118237 | A1 * | 4/2017 | Devi Reddy | H04L 63/1425 |
| 2018/0018590 | A1 * | 1/2018 | Szeto | G06F 21/6254 |
| 2018/0025286 | A1 * | 1/2018 | Gorelik | G06F 30/20 |
| | | | | 706/12 |

(Continued)

OTHER PUBLICATIONS

McMahan, Brendan, et al., "Federated Learning: Collaborative Machine Learning without Centralized Training Data", Google AI Blog, [Online]. Retrieved from the Internet: <URL: https://ai.googleblog.com/2017/04/federated-learning-collaborative.html>, (Apr. 6, 2017), 4 pgs.

*Primary Examiner* — Abdullahi E Salad
(74) *Attorney, Agent, or Firm* — Schwegman Lundberg & Woessner, P.A.

(57) ABSTRACT

Methods, computer readable media, devices, and systems provide for distributed machine learning. In one aspect, a method of training a model is disclosed. The method includes receiving, by a client device, from one or more servers, an intermediate model, training, by the client device, the intermediate model based on private data, and transmitting, by the client device, to the one or more servers, the trained intermediate model.

20 Claims, 12 Drawing Sheets

(56) References Cited

U.S. PATENT DOCUMENTS

| | | | |
|---|---|---|---|
| 2018/0025287 A1* | 1/2018 | Mathew | G06N 20/00 706/12 |
| 2019/0012609 A1* | 1/2019 | Fishier | G06F 21/6245 |
| 2019/0050749 A1* | 2/2019 | Sanketi | G06F 9/44505 |

* cited by examiner

DISTRIBUTED MACHINE LEARNING FOR IMPROVED PRIVACY

CROSS REFERENCE TO RELATED APPLICATIONS

This application claims priority to U.S. Provisional Application No. 62/571,080, filed Oct. 11, 2017 and entitled "DISTRIBUTED MACHINE LEARNING FOR IMPROVED PRIVACY." The contents of this prior application are considered part of this application, and are hereby incorporated by reference in their entirety.

TECHNICAL FIELD

The present disclosure generally relates to the technical field of machine learning. In particular, embodiments provide for the distribution of machine learning to client devices while also preserving privacy of client data.

BACKGROUND

Training large scale machine learning models may include creating a training data set. Typically, individual event data may be collected from a plurality of users, then aggregated on a centralized server or servers through a series of MapReduce pipelines (or similar) and stored in a well-defined format. This training process reduces the training data to a set of weights in a model learned to describe an average behavior of the users.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The disclosed embodiments provide for improved privacy in machine learning implementations. In some aspects, a model may be trained on a client device, eliminating a need to transmit private client data to a server for model training. Instead, the client device may train the model at the client device itself using the private client data, and then transmit the updated model data to the server. To improve privacy associated with training a model, the client device may inject some randomness into modifications made to the model data. This randomness may reduce an ability to reverse engineer the private client data based on updates made to the model data. To further improve privacy, the server may maintain a pool of model data. A first set of model data may be transmitted to the client for training. When the trained data is returned to the server, it may be integrated with a different set of model data than what was provided to the client device. In some aspects, the server may not track the particular set of model data that was sent to the client device, again to improve privacy associated with training the model.

Figure 1:
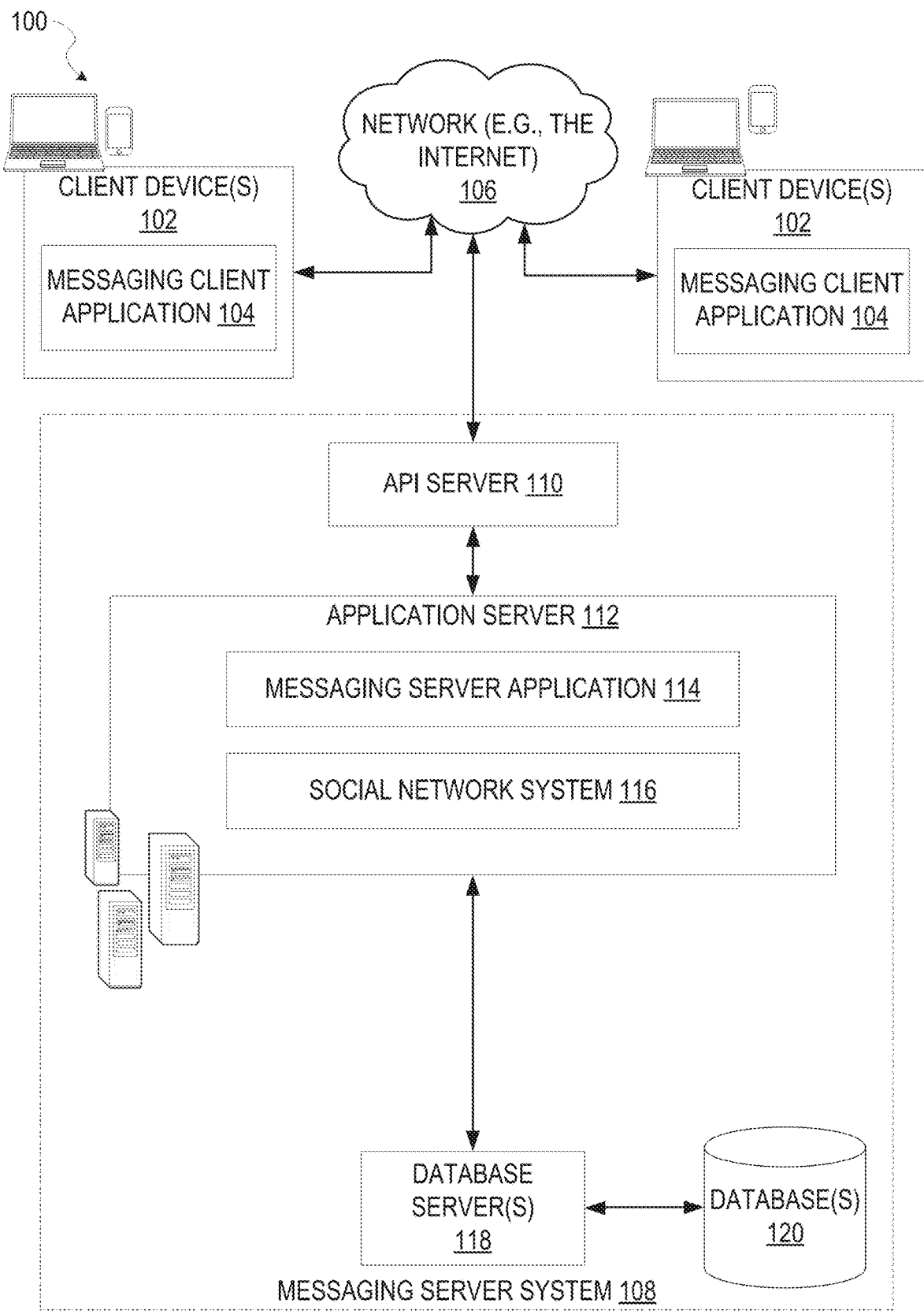
FIG. 1 is an overview diagram of a messaging system.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks. Universal Mobile Telecommunications System (UMTS), High-Speed Packet Access (HSPA). Worldwide Interoperability for Microwave Access (WiMAX). Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
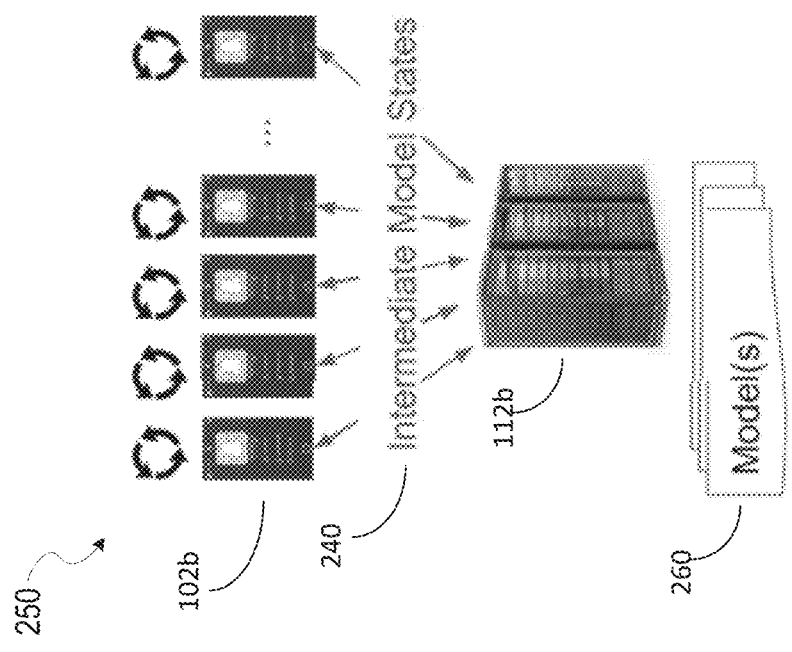
FIG. 2 is a diagram showing two embodiments of machine learning, one of which may be utilized by the disclosed embodiments.
Figure 2:
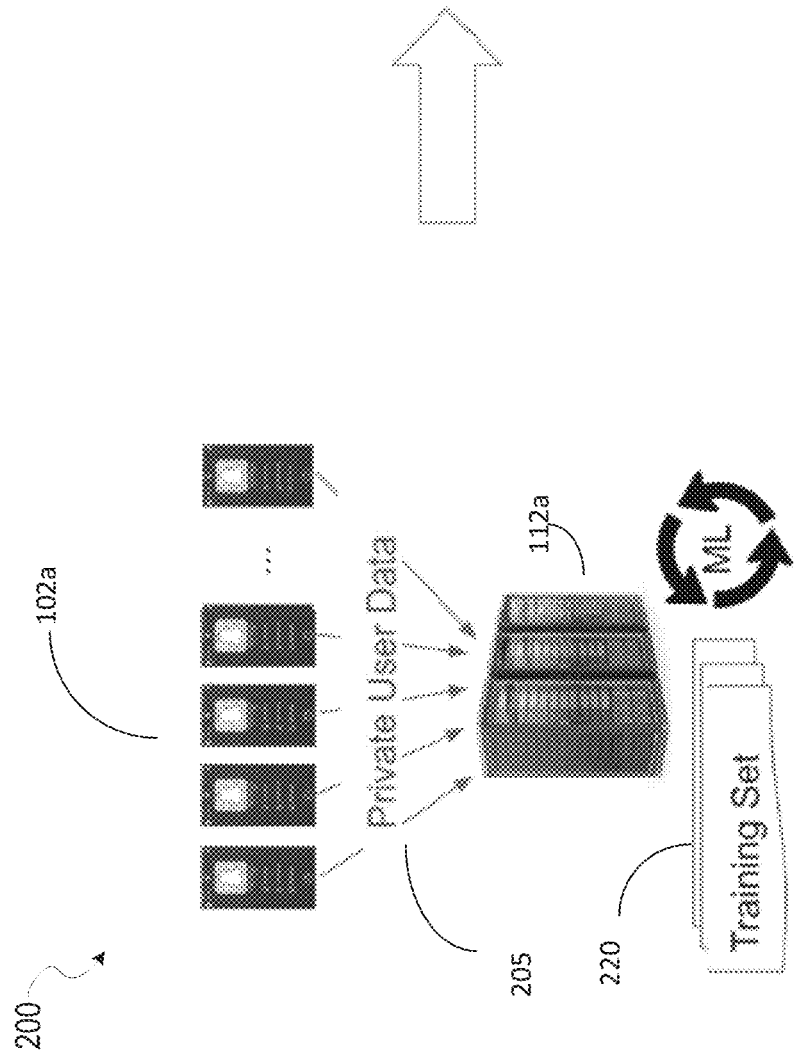

FIG. 2 illustrates two data flows that may be used to train a model. The first data flow 200 shows multiple devices, such as client devices 102*a*, transmitting private user data to a set of servers 112*a*. The servers 112*a* maintain a training set 220, and train a model based on the private user data 205.

Data flow 250 shows client device 102*b* exchanging intermediate model states 240 with the servers 112*b*. In embodiments employing the data flow 250, each of the client devices 102 trains the model using private client data, and updates the intermediate model state received from the servers 112*b*. Private data may include, for example personally identifiable information for a user of one or more of the client devices 102*b*. For example, information regarding behavior of the user may be included in private data, such as a list of web sites visited by the user, which particular advertisements or content displayed to the user are selected, and personal information such as address, social security numbers, passwords, date of birth, name, etc. After training, the updated intermediate model state is returned to the servers 112*b*. The private data used to train the model is not recoverable from the updated intermediate model state resulting from the training.

The servers 112*b* may then integrate the intermediate model states received from the multiple client devices 102 to form a complete model 260. Because private data is not shared with the servers in data flow 250, privacy may be improved in embodiments employing data flow 250 when compared to implementations utilizing data flow 200. Some embodiments employing data flow 250 may support logistic regression models, which provide a binary indicator as an outcome (0/1). Some other embodiments may employ regular linear regression models, which model continuous outcomes. Other models are contemplated, such as neural networks and variations thereof. Furthermore, some contemplated embodiments may employ Bayesian models. Bayesian models may have certain privacy benefits relative to other models in some aspects.

Figure 3:
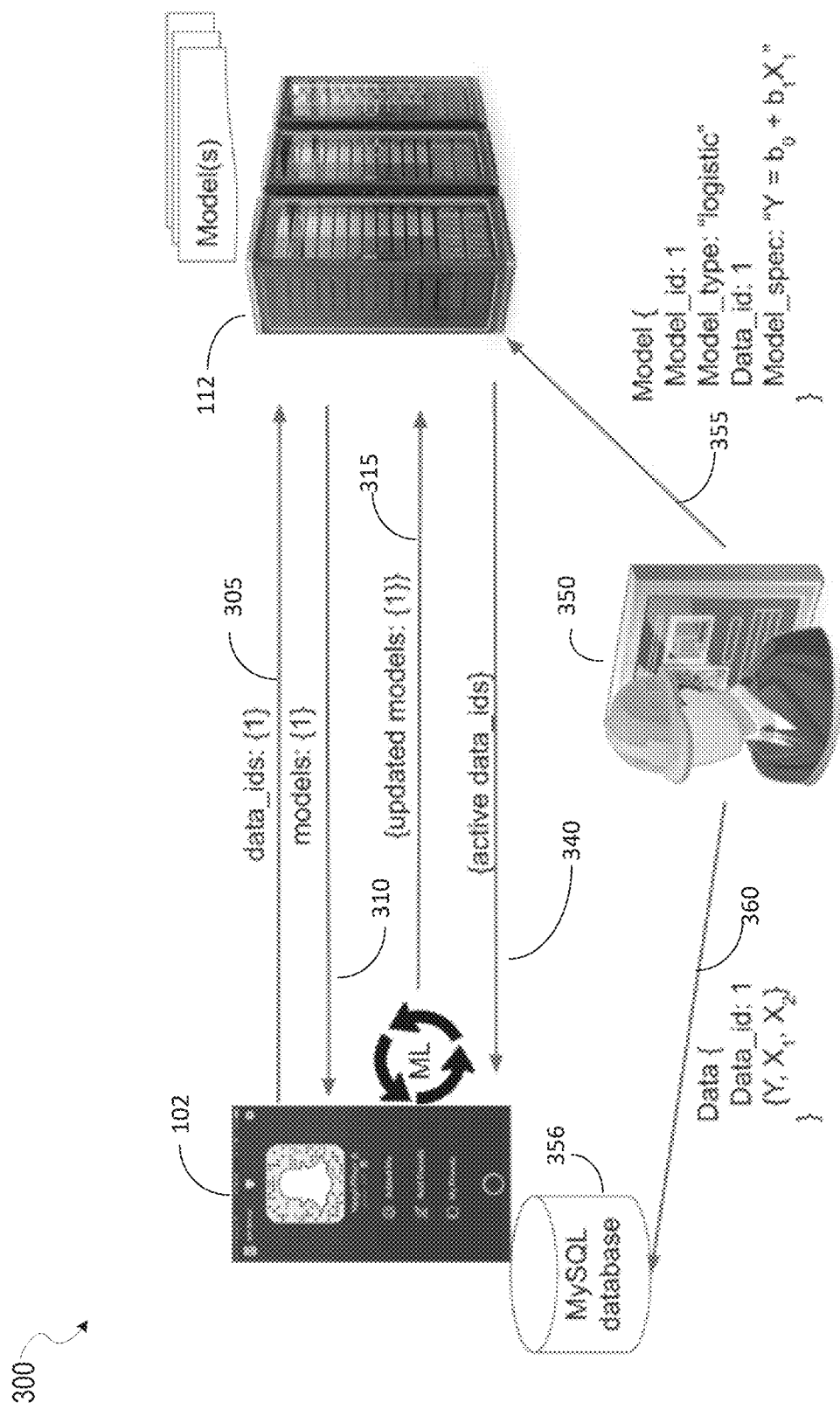
FIG. 3 is a data flow diagram of a distributed machine learning process that may be utilized by at least some of the disclosed embodiments.

FIG. 3 is a data flow diagram of a distributed machine learning process that may be utilized by at least some of the disclosed embodiments. FIG. 3 shows data identifiers may be transmitted from the client device 102 to the server 112 in a message 305. Models applicable to the received data ids in the message 305 may be transmitted by the server 112 to the client device 102 in a second message 310. The second message 310 may be transmitted in response to the first message 305. For example, the sever 112 may transmit models to the client device 102 that are trained by data identified by the data identifiers sent from the client device 102 to the server 112. The server 112 may maintain a pool of intermediate models for each model supported. The server may randomly select one intermediate model for transmission to the client device 102 for each separate model trained by the data identifiers provided by the client.

After training the models provided in the message 310 using the appropriate data identifiers, the client device 102 may transmit the updated models in a third message 315 to the server 112. The server 112 may also transmit a list of active data identifiers in a fourth message 340. The fourth message may be utilized by the client device 102 to determine which type of data to collect for model training (e.g., data matching the active data identifiers).

A model designer 350 may specify a mapping of models to data identifiers in a message 355 to the server 112. A database 356 may be updated with a specification for each data identifier in a message 360.

In some aspects, a memcache may be added to the server 112 to increase throughput. The memcache may be used to improve the queries performed by the server in response to a client update.

Figure 4:
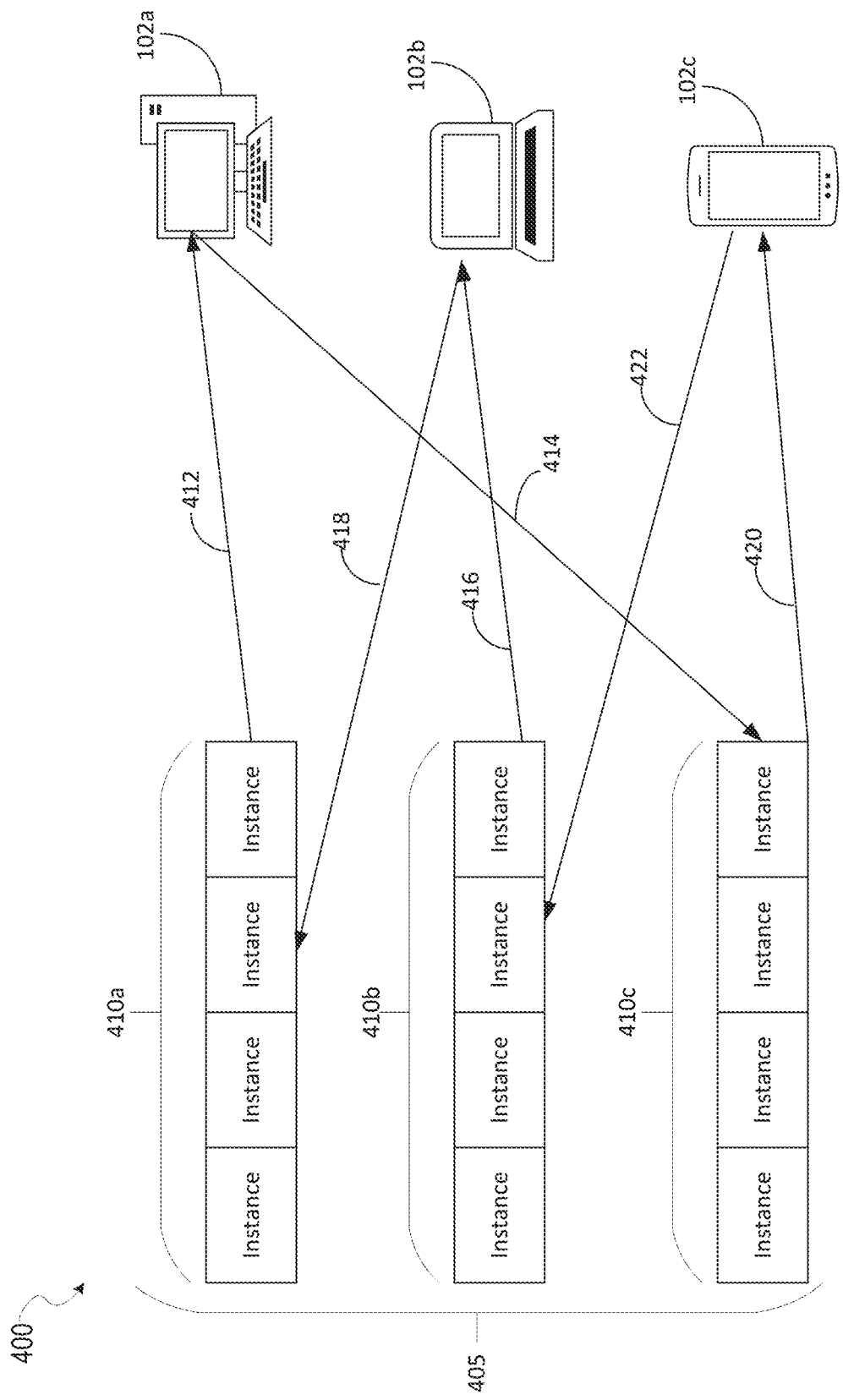
FIG. 4 shows how model data from a pool of model data may be randomly provided to clients, with updates to the model data distributed to random model data of the pool.

FIG. 4 shows how model data from a pool of model data may be randomly provided to client devices. A pool of model data 405 includes model data 410*a-c*. FIG. 4 illustrates model data 410*a* being provided to client 102*a* via a message 412. After updating the model data 410*a*, the updated model data is included in a message 414. The message may be transmitted to a server or cloud implementation including a dynamic number of servers (not shown in FIG. 4), and then the updated model data is integrated with model data 410*c*. Client 102*b* receives model data 410*b* via a message 416. After updating the model data 410*b*, the updated model data is returned to the server (again, not shown) and stored in model data 410*a*. Client 102*c* receives model data 410*c* via message 420. After updating the model data, client 102*c* sends a message 422 to the server (not shown), and the updated model data from client 102*c* is stored as model data 410*b*.

Figure 5:
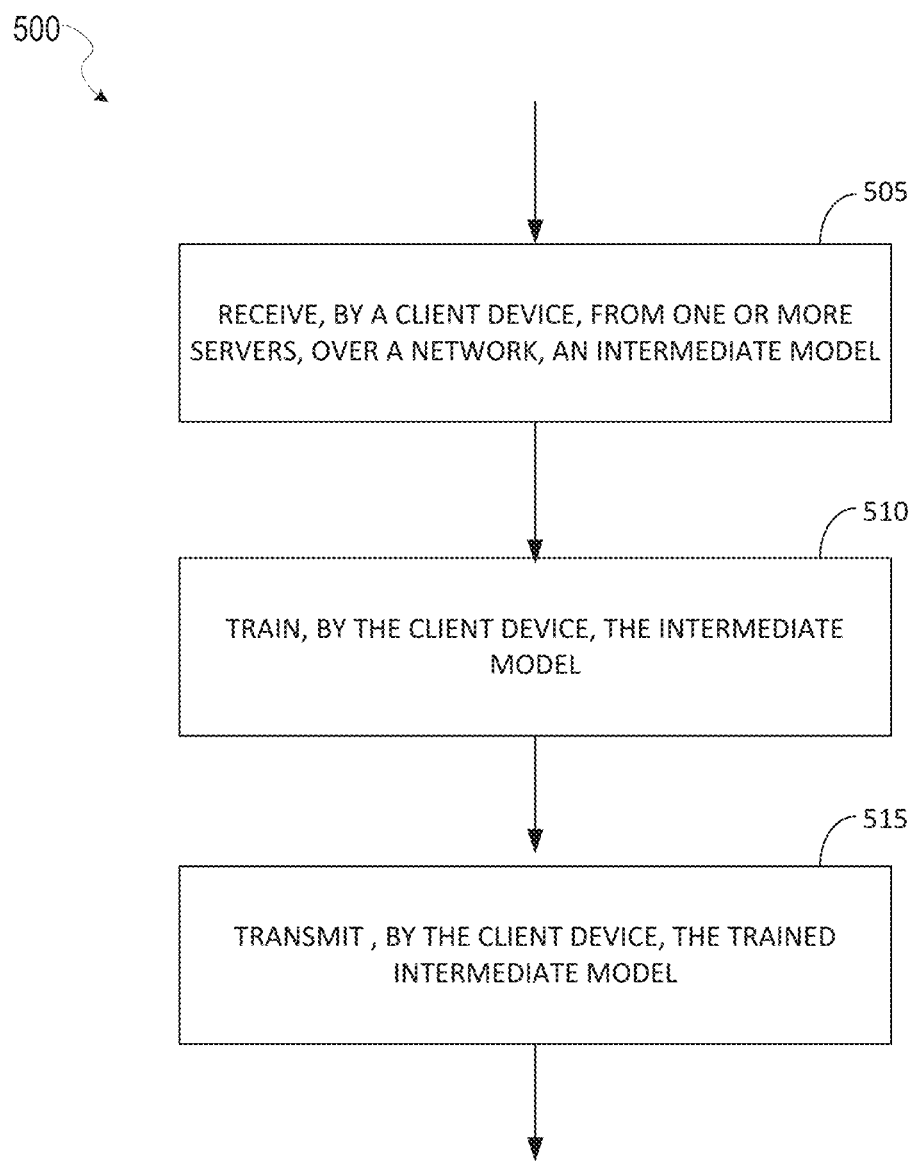
FIG. 5 is a flowchart illustrating aspects of a method, according to some example embodiments.

FIG. 5 is a flowchart for training a model on a client device. In some aspects, one or more of the functions discussed below with respect to FIG. 5 may be performed by a hardware processor. For example, instructions may configure processor to perform one or more of the functions discussed below.

In operation 505, a client device receives, from one or more servers, an intermediate model from a network. In some aspects, a client may collect and store training data. Each training data set may be associated with a data identifier by the client device. For example, data collected and stored by the client device could be of the form:

Data {
Data_id: 1
Example: {Y=0, X1=1, X2=0}
Example: {Y=1, X1=1, X2=1}
}

In some aspects, operation 505 includes transmitting a message to the one or more servers indicating the data ids, and may also indicate a model to fit using the collected data. In some aspects, operation 505 includes receiving, from the one or more servers, a message indicating a list of active data identifiers. The message may also indicate one or more model identifiers that may use particular data id's for training. Thus, the message may include a mapping from model identifiers to data identifiers. Active data identifiers may be those data identifiers being used by at least one active model. In some aspects, the client device may begin collecting data for the identified data identifiers in response to receiving the message.

In operation 510, the client device trains the intermediate model. In some aspects, the training of the intermediate model may be based on data generated and/or stored at the client device. For example, data associated with the data id's identified in a message received from the server may be utilized to train the model. Some aspects of operation 510 include deleting the training data after training the intermediate model.

In some aspects, a Stochastic Gradient Descent (SGD) algorithm is used to train the intermediate model. Some aspects may add noise to weights updated by operation 510. Some aspects may encrypt the updated weights. In some aspects, the training of a logistic or regular linear regression model may utilize Equation 1 below:

$$b^* = b - \text{gamma}*R*X + \text{Laplace}(\text{gamma}/\log(16)), \quad (1)$$

where:
- b=a current state of the model. In some aspects, b is a set of weights, for example b=[0.001, 2, −3, 5].
- b*=an updated model after a client device combines a single record of it's private data with b above. For example, b* may become [0.0012, 1.9, −3.2, 5.1].
- gamma=learning rate. Gamma is a parameter set by the model developer to specify how large the update step should be. Example values include 0.01, 0.001,
- R=is an error or residual. Models are of type Y=bX, where Y is the response and X are the features or predictors (e.g. private user data on a client device). Training a model indicates how X influences Y by learning appropriate b's. R is a difference between a real Y and a predicted Y (Y_hat). Y_hat may be computed by taking a current set of b's and multiplying them by private values of X and summing these products. For example, b=[0.01, 2] and X=[1, 2.] and Y=1. Then R=Y−Y_hat=1−0.01*1+2*2. This provides an indication of how much a model prediction is different from actual values.
- X=features used to predict Y. X may remain private on the client device, laplace is the Laplacian distribution defined by mean and scale. In some aspects, mean=0 and scale=gamma/epsilon. In some aspects, this results in the amount of noise being proportional to the learning rate gamma.

epsilon is user specified parameters that controls the amount of privacy one wants to provide. In some aspects, epsilon's value may be log(16). This may result in 94% of the noise added to be within [−gamma, gamma].

In operation 515, the client device transmits the trained intermediate model to the one or more servers. Some aspects of operation 515 receive a message from the one or more servers, indicating a set of data identifiers for active models.

Figure 6:
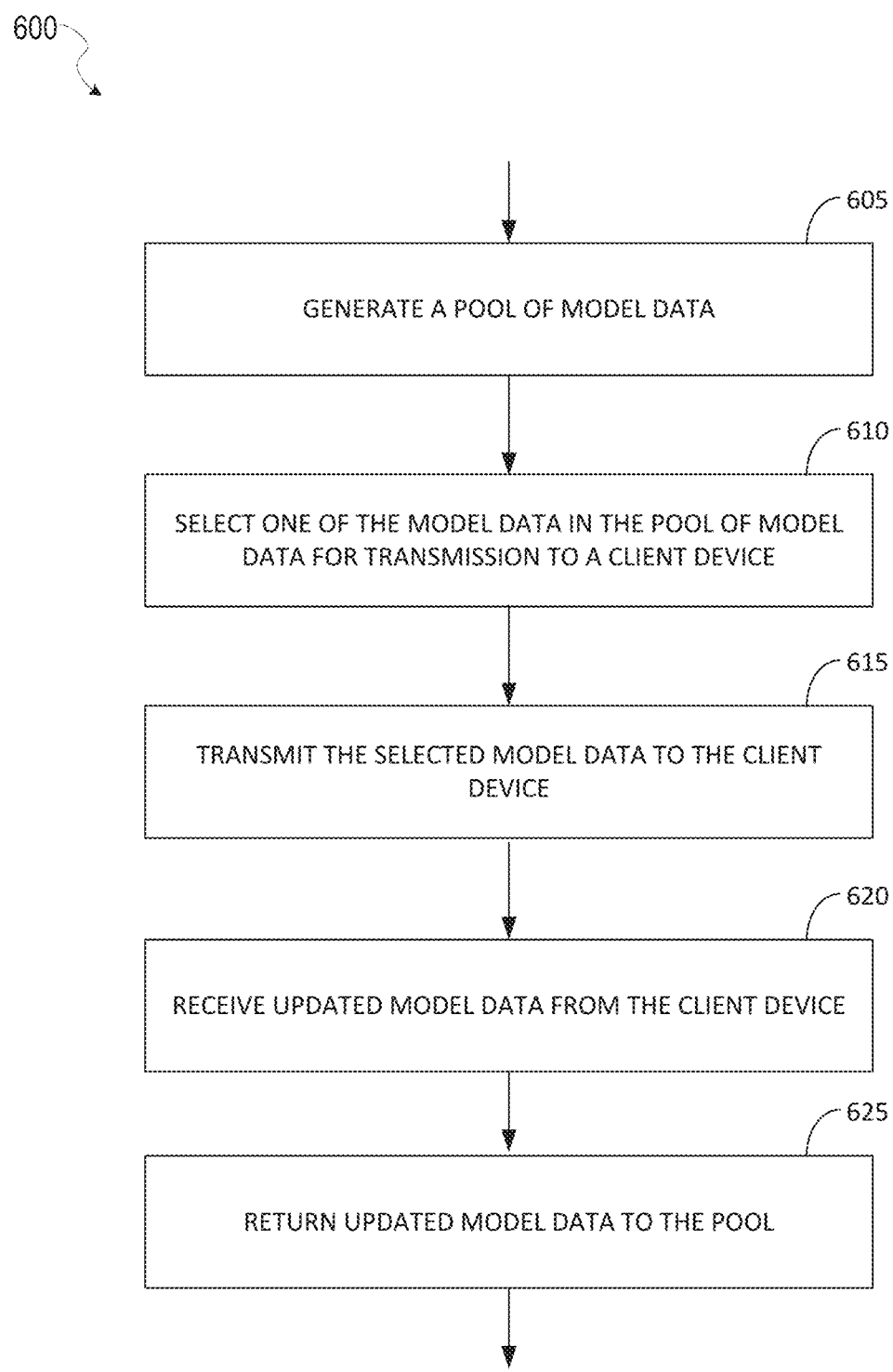
FIG. 6 is a flowchart illustrating aspects of a method, according to some example embodiments.

FIG. 6 is a flowchart of a method of updating a model. In some aspects, one or more of the functions discussed below with respect to FIG. 6 may be performed by hardware processing circuitry, such as one or more hardware processors. For example, in some aspects, instructions may configure a processor to perform one or more of the functions discussed below with respect to FIG. 6.

One method of improving privacy when utilizing a distributed training architecture is to avoid storing information on a server with respect to which model was trained by which client device. To accomplish this, some implementations may generate a pool including multiple models, and distribute these models to client devices as needed for training. Each of these multiple models may start out exactly the same, but then may diverge as each model is trained by different sets of client devices using different sets of training data. A full model may then be periodically generated by combining the models in the pool.

In operation 605, a pool of model data is generated. In some aspects, generating a pool of model data may include initializing the model, and replicating the model n number of times, with n being the size of the pool. In other aspects, generating the pool may include initializing n sets of model data using the same initialization parameters. The model data is an artifact created by a training or initialization process for a machine learning model. The process of training a machine learning model includes providing a machine learning algorithm (e.g. a learning algorithm), with training data to learn from. This is discussed further with respect to FIG. 7 below. The model data represents a state of a model at a particular time. For example, if the model has only been initialized, the model data may not include any data mapping training data to model conclusions or results, or to any loss information. As a model is trained, the model data evolves to encapsulate learning by the machine learning algorithm to the types of inputs it may receive and the most desirable (i.e. resulting in the lowest loss measurements) results.

Machine learning may learn a mapping Y=f(x) to make predictions of Y for a new X. This is called predictive modeling or predictive analytics. Some example types of machine learning algorithms that may be implemented in the disclosed embodiments include linear regression, logistic regression, linear discriminant analysis, classification and regression trees, naïve bayes, K-Nearest neighbors, learning vector quantization, support vector machines, Bagging and Random Forest, among others.

In operation 610, one of the model data in the pool is selected for transmission to a client device. In some aspects, selecting the model data removes the model data from the pool. For example, some aspects may implement the model data pool using a queue. Selecting the model data in these aspects may include removing model data from the head of the queue.

In operation 615, the selected model data is transmitted to the client device. In some aspects, a plurality of model data from the pool is transmitted to a corresponding plurality of client devices.

In operation 620 an updated version of the selected model data is received from the client device. In some embodiments, a plurality of different updates to model data from the pool is received from a plurality of client devices. As discussed in operation 615, the plurality of model data may have been sent to the client devices. After each of the plurality of client devices trains its respective portion of model data, these model data are returned to the server.

In operation 625, the updated model data is returned to the pool. For example, in those aspects implementing the pool as a queue, operation 625 may insert the updated model data into the queue. If a plurality of model data was sent to the plurality of client devices as discussed above, the plurality of updated model data received from the plurality of client devices is returned to the pool in operation 625. In some aspects, process 600 may periodically integrate model data included in the pool and generate a new pool of model data that incorporates the training done to the previous pool.

Figure 7:
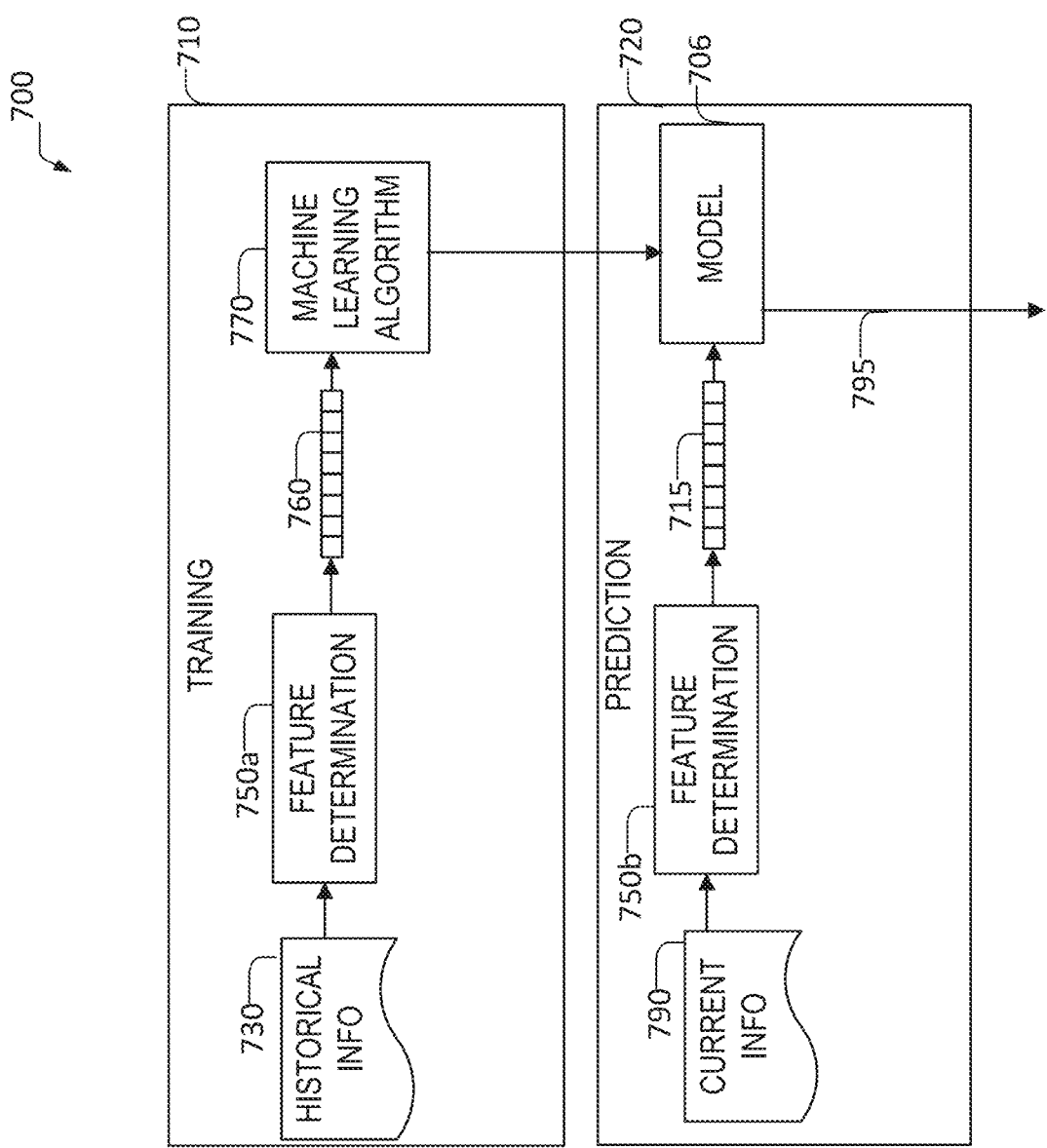
FIG. 7 shows an example machine learning module according to some examples of the present disclosure.

FIG. 7 shows an example machine learning module 700 according to some examples of the present disclosure. Machine learning module 700 utilizes a training module 710 and a prediction module 720. Training module 710 inputs historical information 730 into feature determination module 750a. The historical information 730 may be labeled. Example historical information may include text or statements stored in a training library of text or statements. Labels may indicate portions of the text or statements that provide assertions.

Feature determination module 750a determines one or more features 760 from this historical information 730. Stated generally, features 760 are a set of the information input and is information determined to be predictive of a particular outcome. In some examples, the features 760 may be all the historical activity data, but in other examples, the features 760 may be a subset of the historical activity data. The machine learning algorithm 770 produces a model 706 based upon the features 760 and the label.

In the prediction module 720, current information 790 may be input to the feature determination module 750. Feature determination module 750b may determine the same set of features or a different set of features from the current information 790 as feature determination module 750a determined from historical information 730. In some examples, feature determination module 750a and 750b are the same module. Feature determination module 750b produces feature vector 715, which is input into the model 706 to generate a likelihood of response score 795. The training module 710 may operate in an offline manner to train the model 706. The prediction module 720, however, may be designed to operate in an online manner. It should be noted that the model 706 may be periodically updated via additional training and/or user feedback.

The machine learning algorithm 770 may be selected from among many different potential supervised or unsupervised machine learning algorithms. Examples of supervised learning algorithms include artificial neural networks. Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 710. In an example embodiment, a regression model is used and the model 780 is a vector of coefficients corresponding to a learned importance for each of the features in the vector of features 760, 715. To calculate a score, a dot product of the feature vector 715 and the vector of coefficients of the model 706 is taken.

Embodiments of this disclosure may copy or generate multiple models 706, and distribute these multiple models to multiple client devices, as described above, for example, with respect to FIG. 6. After the multiple models are individually trained further (via a process that may be similar to 710 described above) by these client devices, the updated models may be returned to a centralized system, which may then combine the multiple copies of the updated model (e.g. 706) into a single model. A process similar to the prediction process 720 may then be performed using the combined version of the updated model. In some aspects, one or more of the model data 410a-c discussed above with respect to FIG. 4 may include the model 706. Similarly, any of the models discussed above with respect to FIG. 3, such as those included in messages 310 or 315, may be equivalent to the model 706 discussed with respect to FIG. 7.

Figure 8:
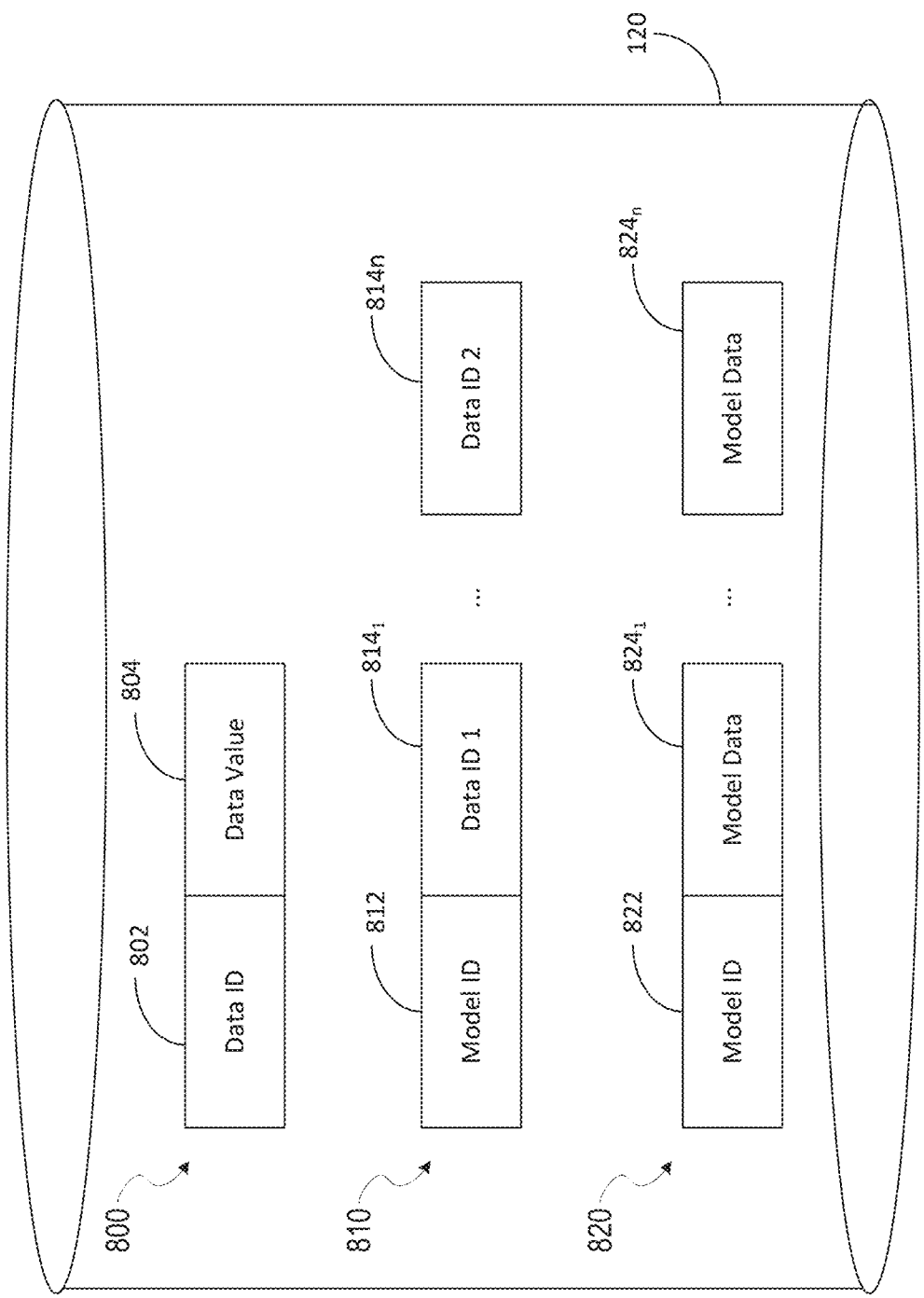
FIG. 8 shows example data structures, one or more of which are implemented by at least some of the disclosed embodiments.

FIG. 8 shows example data structures, one or more of which are implemented by at least some of the disclosed embodiments. FIG. 8 shows a data table 800, model parameters table 810, and a model table 820. While the data structures shown in FIG. 8 are described below as tables, they may be implemented as tables in a relational database, such as the database 120. Alternatively, the tables described below may be implemented as other types of data structures, such as linked lists, queues, or other appropriate memory based data structures.

The data table 800 includes a data identifier 802, and a data value field 804. The data table 800 stores data that is private to a client device. In other words, values stored in the data value field 804, may, in some embodiments, represent personally identifiable information (PII) or other data that is not shared outside the device. This may include, for example, browser histories, logs of user interface selections, or other indications of private activity on the device. The data identifier 802 may identify the type of data stored in the data value field 804. As discussed above, in some aspects, a client device may receive a list of data identifiers that identify data to be used to train a model. The data identifiers stored in field 802 may correspond to those received data identifiers.

The model parameters table 810 includes a model identifier 812, and one or more data identifiers $814_{1...n}$. The data identifiers $814_{1...n}$ identify parameters that may be used to train a model identified by the model identifier 812. The data identifiers $814_{1...n}$ may be cross referenced with the data identifiers 802 in the data table 800. By cross referencing data identifiers 8141 . . . n with data identifiers including in the data identifier field 802 (e.g. multiple rows of table 800), a client device may match up data values (e.g. 804) to provide as training data to a model (e.g. identified by model id 812 and/or 822).

The model database 820 includes a model identifier 822, and one or more model data fields $824_{1...n}$. The model identifier 822 uniquely identifies a model. The model data $824_{1...n}$ may store data representing multiple instances or a "pool" of data for the model identified by the model identifier 822. The model identifier 822 may be cross referenced with the model identifier 812.

Figure 9:
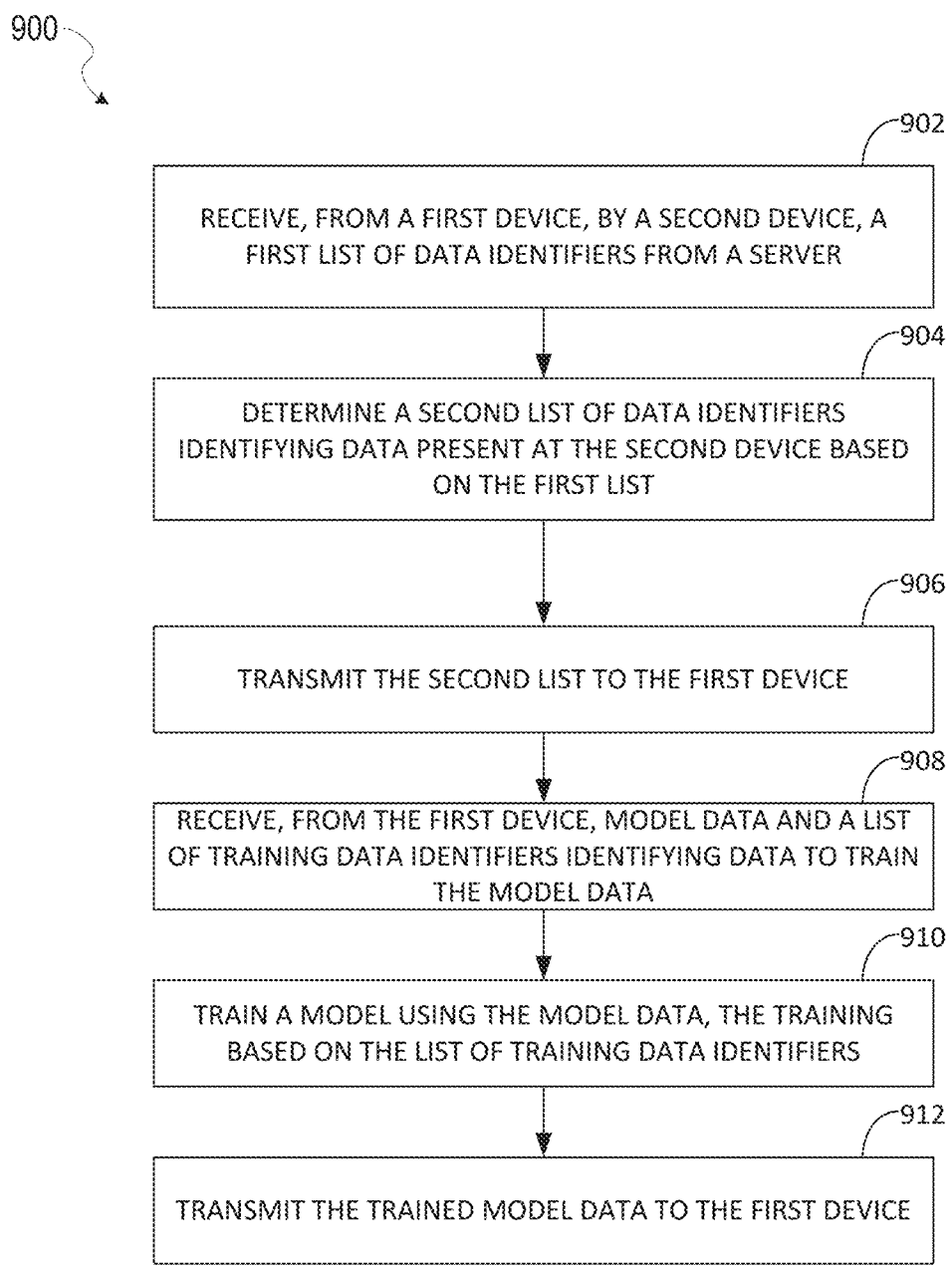
FIG. 9 is a flowchart of an example method that is implemented by at least one of the disclosed embodiments.

FIG. 9 is a flowchart of an example method that is implemented by at least one of the disclosed embodiments. One or more of the functions discussed below with respect to FIG. 9 are performed by hardware processing circuitry. For example, instructions stored in an electronic hardware memory, when executed, configure the hardware processing circuitry to perform one or more of the functions discussed below with respect to FIG. 9.

While the discussion of FIG. 9 below describes communication between a client device and a server device, one of skill in the art will understand that server devices may be implemented using a cloud based implementation. In these implementations, a single destination IP address, hosted by a cloud implementation, may be "serviced" by a varying number and identify of physical hardware boxes. Thus, in these implementations, the term server may not necessarily refer to a single physical hardware box throughout the discussion, but could represent multiple different hardware for any one particular function. In some aspects, the term server may represent an endpoint of a network connection, such as a TCP connection. Alternatively, the term server may represent an endpoint of a UDP communication between two UDP service access points. In still other embodiments, the term server may represent a single physical hardware box. In some aspects, process 900 may be performed hardware processing circuitry included in a client device, such as any of the client devices 102a-c.

In operation 902, a first list of data identifiers is received from a first device by a second device. In some aspects, the first device may be a server device and the second device may be a client device. The list of data identifiers may be received in a network message for example. The list of data identifiers each identify a particular type of data or type of data value. For example, a first identifier may identify data that represents a user name. A second identifier may identify data that represents phone numbers, or social security numbers. In this example, the first identifier is not a user name, but may be a number, such as one (1). The number or identifier identifies user name data via a mapping at both the client and server device from the identifier to data storing user names. The mapping may be dynamic or statically hard coded at both the first and second devices. Similarly, the second identifier is not a phone number, but identifies stored data representing a phone number.

In operation 904, a second list of data identifiers is determined based on the first list of data identifiers. The second list of data identifiers may be an intersection of the first list of data identifiers and data identifiers for data available at the second device. In some aspects, the second device may scan a data structure, such as table 800 discussed above, that identifies data available at the second device. The scanning process may identify data identifiers for data available at the second device that is included in the first list.

In operation 906, the second list is transmitted to the first device. In some aspects, the second list is included in a message transmitted to the first device. For example, as shown in FIG. 3, the client device 102 transmits data identifiers via message 305 to an application server 112.

In operation 908, model data is received from the first device. A list of training data identifiers is also received. The training data identifiers identify data to train the model data. For example, a message may be received by the second device that lists one or more of the data identifiers stored in a data structure of the second device identifying data available at the second device. As example of this is the data table 800, which includes data identifier(s) identifying data values (e.g. 804).

In operation 910, a model is trained using the model data received in operation 908. The model is trained based on the list of training data identifiers. For example, operation 910 may include identifying data values based on the list of training data identifiers. For example, a search of the data table 800 based on a data identifier may identify a data value 804 in a same row as the matching data identifier 802. This data value may be provided to a model, which trains the model based on the model data. This may be repeated for multiple data identifiers included in the list of training data. In some aspects, multiple parameters may be passed to a model for training based on multiple data identifiers included in the message received in operation 908.

In operation 912, the trained model data is transmitted to the first device. For example, as shown in FIG. 3, a client device 102 may transmit one or more updated models to application server(s) 112.

Figure 10:
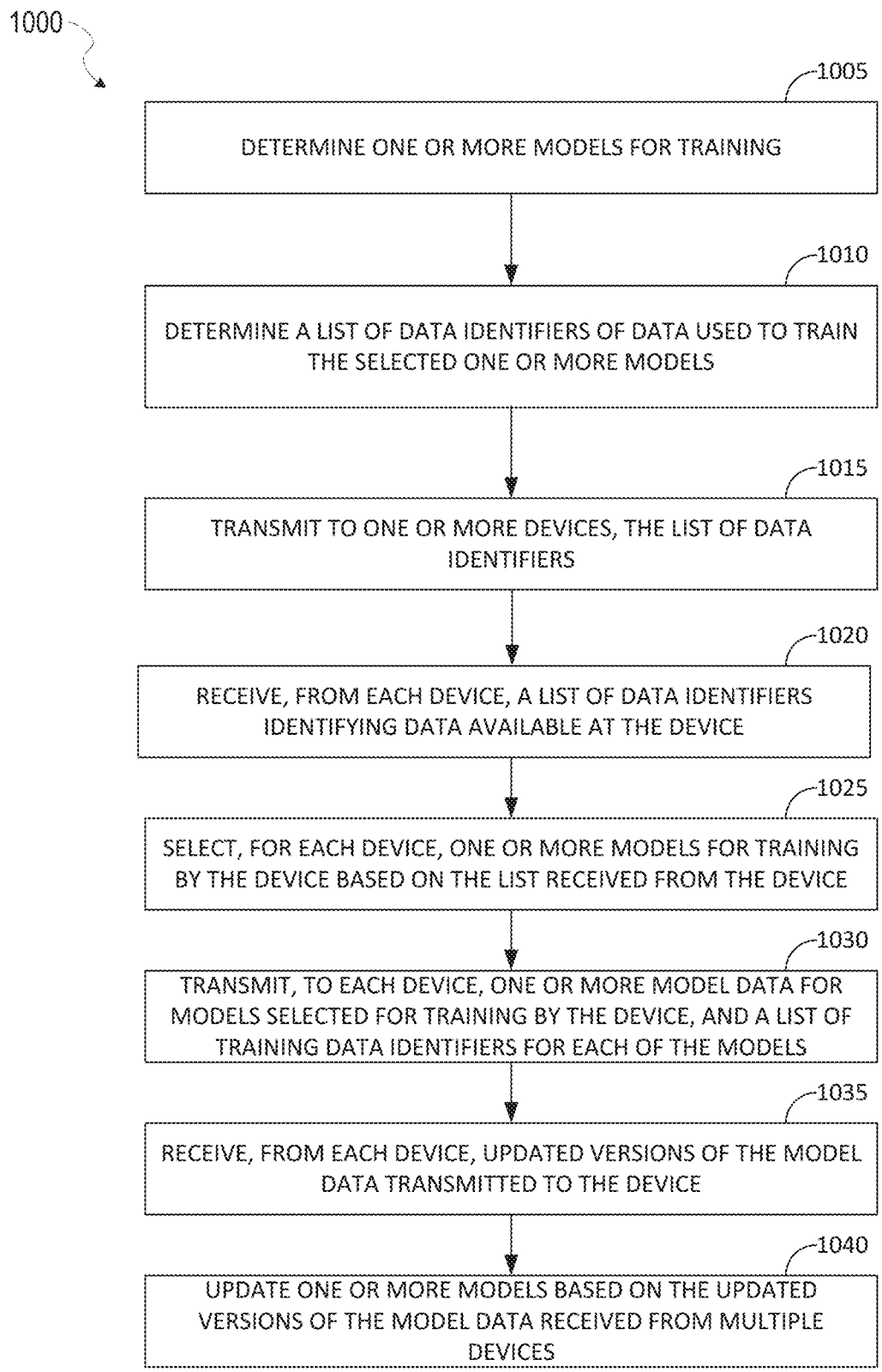
FIG. 10 is a flowchart of an example method for distributed training of a model.

FIG. 10 is a flowchart of an example method for distributed training of a model. One or more of the functions discussed below with respect to FIG. 10 are performed by hardware processing circuitry. For example, instructions stored in an electronic hardware memory, when executed, configure the hardware processing circuitry to perform one or more of the functions discussed below with respect to FIG. 10.

While the discussion of FIG. 10 below describes communication between a client device and a server device, one of skill in the art will understand that server devices may be implemented using a cloud based implementation. In these implementations, a single destination IP address, hosted by a cloud implementation, may be "serviced" by a varying number and identify of physical hardware boxes. Thus, in these implementations, the term server may not necessarily refer to a single physical hardware box throughout the discussion, but could represent multiple different hardware for any one particular function. In some aspects, the term server may represent an endpoint of a network connection, such as a TCP connection. Alternatively, the term server may represent an endpoint of a UDP communication between two UDP service access points. In still other embodiments, the term server may represent a single physical hardware box. In some aspects, process 1000 may be performed hardware processing circuitry included in one or more server devices, such as the application server(s) 112.

In operation 1005, one or more models are selected for training. The models may be selected for training based on a variety of criterion which vary by embodiment. In some embodiments, a model may be selected for training based on an elapsed time since a previous training was performed. In some embodiments, a model may be selected based on an amount of training done to the model. In some aspects, a model may be selected for training based on loss values determined for the model.

In operation 1010, a first list of data identifiers is determined. The first list of data identifiers identify data used to train the models selected in operation 1005. In some aspects, a device performing process 1000 may manage multiple different models. Each of these models may receive different training inputs. As discussed above with respect to the example tables 810 and 820, data may be maintained identifying multiple models via at least unique model identifiers (e.g. 822). Each unique model may receive different training inputs. (e.g., as identified by the model parameters table 810). For example, a first model may receive a first and second parameter as training input, while a second model may receive the second parameter and a third parameter as input. Thus, operation 1010 may determine a superset of training inputs used to train the selected models of operation 1005. In the example above, the superset may be the first, second, and third parameter. Thus, data identifiers for each of the first, second, and third parameters may be determined by operation 1010.

Operation 1015 transmits the first list of data identifiers determined in operation 1010 to one or more devices. For example, an application server (e.g., 112) may transmit the list of data identifiers to a client device (e.g. 102), as shown in FIG. 3, via message 340.

In operation 1020, a second list of data identifiers is received from each of the one or more devices. Each second list identifies data available at the respective device. As discussed above, in some embodiments, client devices (e.g. 102) may maintain a data table (e.g. 800) storing data identifiers (e.g. 802) for data values (e.g. 804) maintained by the client device. In response to receiving the second list of data identifiers, each client device may scan its data table to determine which of the second list of data identifiers are included in the data table. This subset of the first list is provided, by the client device, to the server as the second list.

In operation 1025, for each device, a list of models is generated that may be trained based on the data available at the respective device. Thus, to continue the example above, if a first model requires two parameters of a first and second type of data, and a second model requires two parameters of the first and third type of data, and a device indicates that it only has the first and second type of data is available, then that device will be selected to train the first model but not the second model.

In operation 1030, the model data for each of the selected models for each device is transmitted to the device. For example, as discussed above, in some aspects, a model may be represented by pools of data. Each data set within the pool may be independently distributed to different client devices for training. After training, the trained data sets of the pool may be periodically recombined to "share" the training from the multiple devices into a single representation of the model. In operation 1030, individual data sets within a pool of data for each of the selected model is transmitted to each respective device according to the selections of operation 1025. Devices receiving these data sets then train the respective models based on the data they previously indicated was available.

In operation 1035, updated versions of the model data, previously transmitted to the devices, is received back from the respective devices.

In operation 1040, one or more models are updated based on the updated model data received from the devices. For example, as discussed above, updated model data received from a device may replace or be added to the model table 820, as an entry 822$_n$. As discussed above, as model data in a pool of model data for a particular model is received back from devices, the data may be recombined to form a single model, which essentially shares the training that occurred at multiple devices into a single instance of the model. This recombined model may then be re-pooled in some aspects, to be redistributed to additional devices for additional training. The process may iterate any number of times until a training completion criterion is met for the model.

Software Architecture

Figure 11:
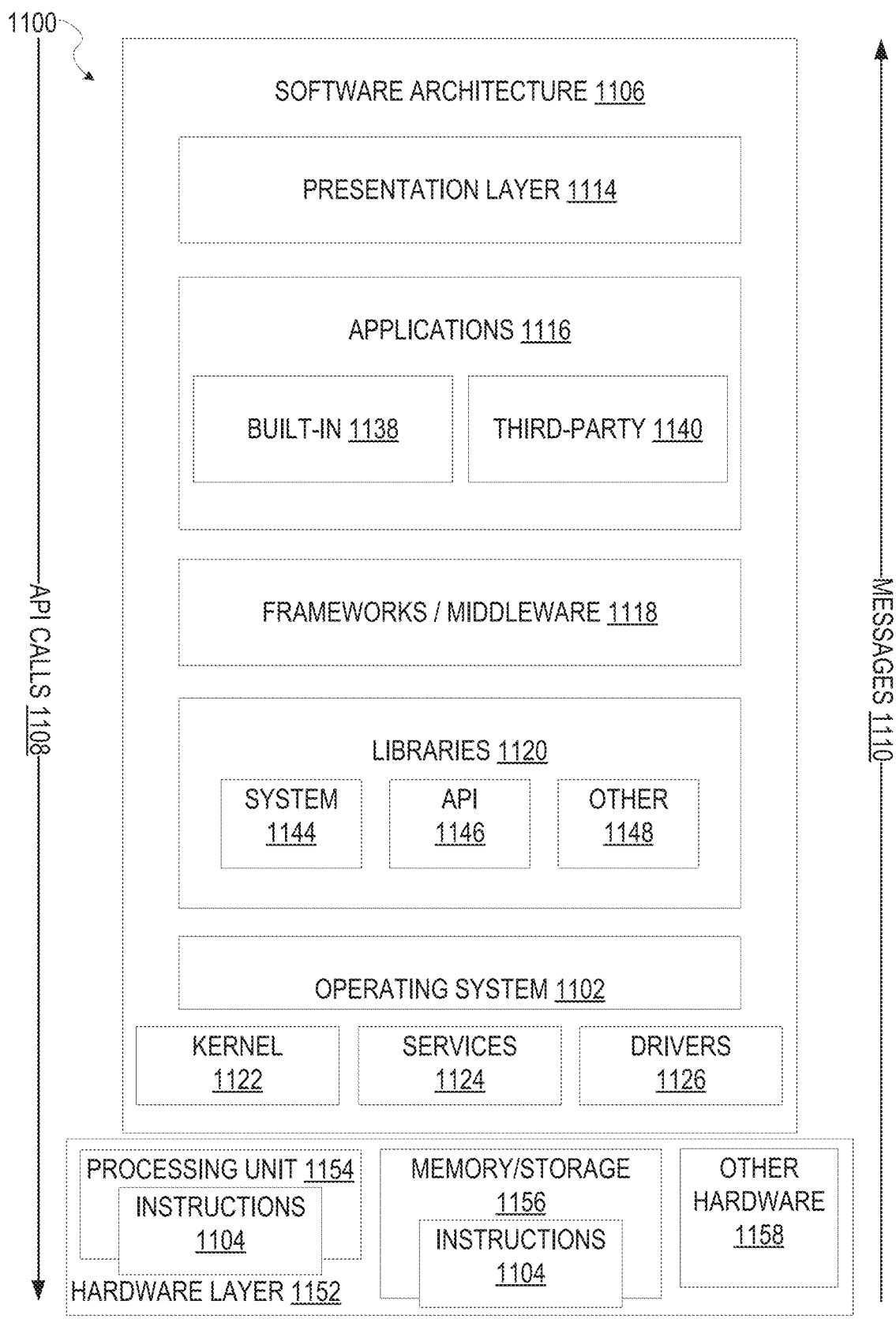
FIG. 11 is a block diagram of a software architecture that may be utilized by one or more of the disclosed embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as a machine 1200 of FIG. 12 that includes, among other things, processors 1104, memory/storage 1106, and I/O components 1118. A representative hardware layer 1152 is illustrated and can represent, for example, the machine 1200 of FIG. 12. The representative hardware layer 1152 includes a processing unit 1154 having associated executable instructions 1104. The executable instructions 1104 represent the executable instructions of the software architecture 1106, including implementation of the methods, components, and so forth described herein. The hardware layer 1152 also includes memory and/or storage 1156, which also have the executable instructions 1104. The hardware layer 1152 may also comprise other hardware 1158.

As used herein, the term "component" may refer to a device, a physical entity, or logic having boundaries defined by function or subroutine calls, branch points. APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands." "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive a response as messages 1110. The layers illustrated are representative in nature and not all software architectures have all layers. For example, some mobile or special-purpose operating systems may not provide a frameworks/middleware 1118 layer, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than by interfacing directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. The third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as the operating system 1102) to facilitate functionality described herein.

The applications 1116 may use built-in operating system functions (e.g., kernel 1122, services 1124, and/or drivers 1126), libraries 1120, and frameworks/middleware 1118 to create user interfaces to interact with users of the system. Alternatively, or additionally, in some systems interactions with a user may occur through a presentation layer, such as the presentation layer 1114. In these systems, the application/component "logic" can be separated from the aspects of the application/component that interact with a user.

Example Machine

Figure 12:
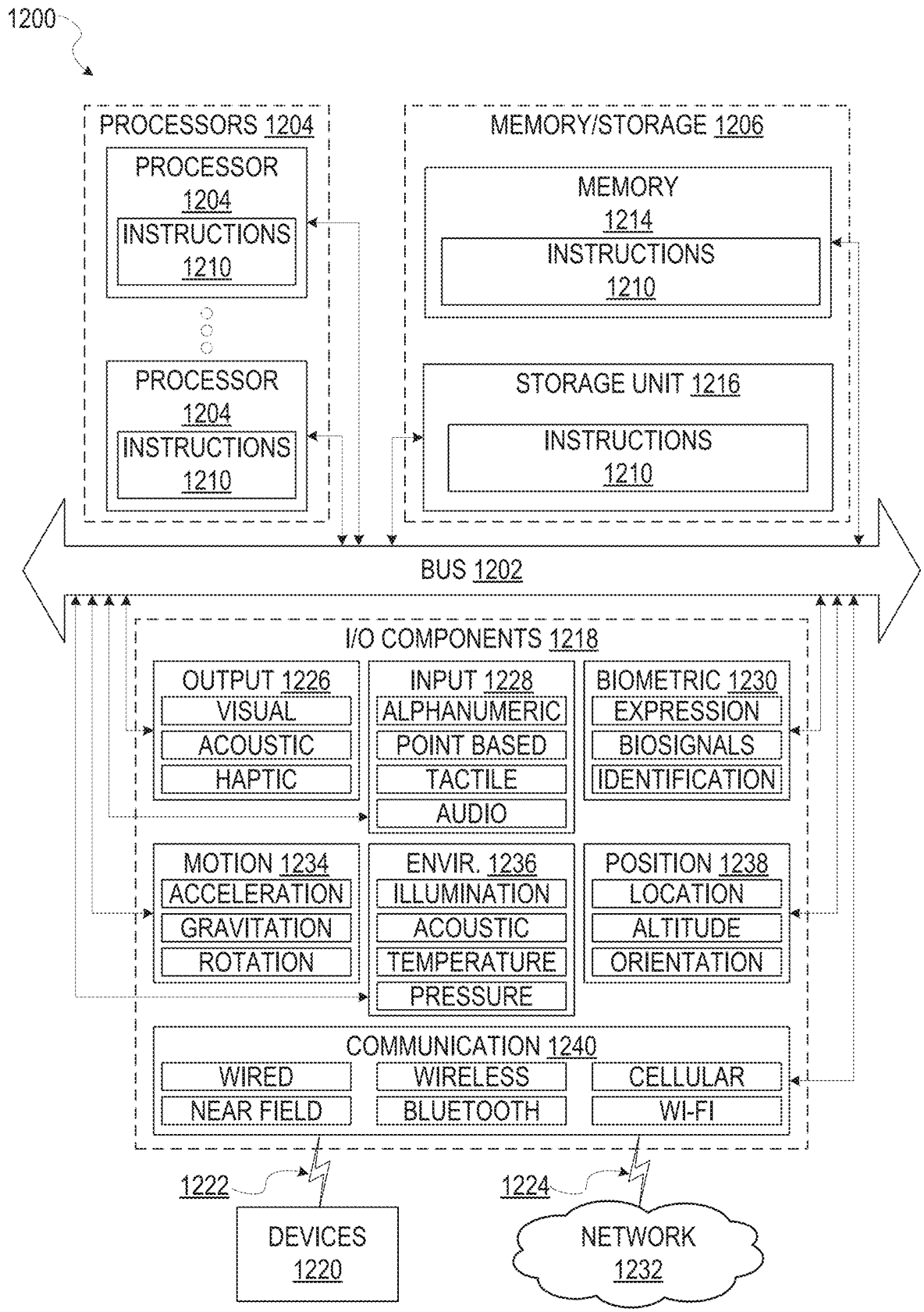
FIG. 12 is a block diagram of a hardware architecture that may be utilized by one or more of the disclosed embodiments.

FIG. 12 is a block diagram illustrating exemplary components (also referred to herein as "modules") of a machine 1200. In some aspects, the machine is configured to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of the processors 1204 are examples of machine-readable media. In some aspect, the processing unit 1154 and processors 1204 may be the same processors.

As used herein, the term "machine-readable medium," "computer-readable medium." or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1218 may include a wide variety of components to provide a user interface for receiving input, providing output, producing output, transmitting information, exchanging information, capturing measurements, and so on. The specific I/O components 1218 that are included in the user interface of a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various exemplary embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1228 may also include one or more image-capturing devices, such as a digital camera for generating digital images and/or video.

In further exemplary embodiments, the I/O components 1218 may include biometric components 1230, motion components 1234, environment components 1236, or position components 1238, as well as a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via a coupling 1224 and a coupling 1222 respectively. For example, the communication components 1240 may include a network interface component or other suitable device to interface with the network 1232. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

We claim:

1. A method, comprising:
   generating, by hardware processing circuitry, a pool of model data for a model, the pool including a plurality of model data, each of the plurality of model data representing a state of the model;
   selecting, by the hardware processing circuitry, at least two of the model data in the pool of model data for transmission to at least two devices, the selecting comprising causing a first device of the at least two devices to train a first model without training a second model based on a determination that the first device comprises a type of data associated with the first model, the first model corresponding to a first of the at least two of the model data and the second model corresponding to a second of the at least two of the model data;
   transmitting, by the hardware processing circuitry, the selected at least two of the model data respectively to the at least two devices;
   receiving, by the hardware processing circuitry, updated model data from each of the at least two devices; and
   returning, by the hardware processing circuitry, the updated model data to the pool of model data.

2. The method of claim 1, further comprising:
   causing a second device of the at least two devices to train the first and second models based on a determination that the second device comprises a second type of data associated with the first and second models; and
   integrating the plurality of model data into a single copy of model data, and classifying data based on the single copy of the model data.

3. The method of claim 1, further comprising:
   determining a list of data identifiers for the first model, the data identifiers identifying data used to train the first model;
   transmitting, to the at least two devices, the list of data identifiers; and
   causing the first device to begin collecting data corresponding to the list of data identifiers for training the first model in response to receiving the list of data identifiers.

4. The method of claim 3, further comprising:
   receiving, from one or more of the at least two devices, a message indicating data identifiers, the data identifies indicating data available at the at least two devices respectively; and
   selecting the model for training based on the indicated data identifiers.

5. The method of claim 1, further comprising:
   storing a mapping between a plurality of models and corresponding lists of one or more input parameters used for training each of the plurality of models; and
   determining of a list of data identifiers for the model is based on the mapping.

6. The method of claim 1, further comprising predicting whether a URL is included on a blacklist based on the pool of model data.

7. The method of claim 1, further comprising performing a regular linear regression, logistic regression, neural network training, or Bayesian model training based on the updated model data.

8. A system, comprising:
   hardware processing circuitry;
   an electronic hardware memory, operably coupled to the hardware processing circuitry, and storing instructions that when executed cause the hardware processing circuitry to perform operations comprising:
   generating a pool of model data for a model, the pool including a plurality of model data, each of the model data representing a state of the model;
   selecting at least two of the model data in the pool of model data for transmission to at least two devices, the selecting comprising causing a first device of the at least two devices to train a first model without training a second model based on a determination that the first device comprises a type of data associated with the first model, the first model corresponding to a first of the at least two of the model data and the second model corresponding to a second of the at least two of the model data;
   transmitting the selected at least two of the model data respectively to the at least two devices;
   receiving updated model data from each of the at least two devices; and
   returning the updated model data to the pool of model data.

9. The method of claim 3, further comprising causing the first device to delete the collected data after training the first model.

10. The method of claim 1, further comprising:
   determining an elapsed time since a previous training of the first model was performed; and
   selecting the first model for training based on the elapsed time since the previous training for the first model was performed.

11. The system of claim 8, the operations further comprising:
   receiving, from one or more of the at least two devices, a message indicating data identifiers, the data identifies indicating data available at the at least two devices respectively; and
   selecting the first model for training based on the indicated data identifiers.

12. The system of claim 8, the operations further comprising:
   storing a mapping between a plurality of models and corresponding lists of one or more input parameters used for training each of the plurality of models; and
   determining of a list of data identifiers for the model is based on the mapping.

13. The system of claim 8, the operations further comprising predicting whether a URL is included on a blacklist based on the pool of model data.

14. The system of claim 8, the operations further comprising performing a regular linear regression, logistic regression, neural network training, or Bayesian model training based on the updated model data.

15. A client device for training a model, comprising:
   hardware processing circuitry; and
   a hardware memory storing instructions that when executed configure the hardware processing circuitry to perform operations comprising:
      storing a mapping between a plurality of models and corresponding lists of one or more input parameters used for training each of the plurality of models;
      determining of a list of data identifiers for a first model based on the mapping;
      receiving, from a first device, model data representing a state of the first model;
      training, based on the model data and the list of data identifiers, a first model without training a second model based on a determination that the client device comprises a type of data associated with the first model; and
      transmitting the trained first model to the first device.

16. The device of claim 15, the operations further comprising receiving, from the first device, data identifiers identifying data for training the first model, wherein training the first model comprises searching a data store to identify data based on the data identifiers, and providing the identified data to the first model to train the first model.

17. The device of claim 16, wherein the identified data comprises personally identifiable information (PII), and wherein the PII is not present in the trained first model.

18. The device of claim 15, the operations further comprising transmitting the list of data identifiers to the first device.

19. The device of claim 15, wherein training the first model comprises adding random noise to the model data to generate the trained first model.

20. The device of claim 15, the operations further comprising training the model by performing a regular linear regression, logistic regression, neural network training, or Bayesian model training.

* * * * *

UNITED STATES PATENT AND TRADEMARK OFFICE
CERTIFICATE OF CORRECTION

| | |
|---|---|
| PATENT NO. | : 11,341,429 B1 |
| APPLICATION NO. | : 16/158010 |
| DATED | : May 24, 2022 |
| INVENTOR(S) | : Pihur et al. |

It is certified that error appears in the above-identified patent and that said Letters Patent is hereby corrected as shown below:

In the Claims

In Column 20, Line 31, in Claim 5, after "model", delete "is"

In Column 21, Line 20, in Claim 12, after "model", delete "is"

Signed and Sealed this
Twenty-seventh Day of December, 2022

Katherine Kelly Vidal
*Director of the United States Patent and Trademark Office*